United States Patent
Sung et al.

(10) Patent No.: US 7,263,987 B2
(45) Date of Patent: Sep. 4, 2007

(54) GRILL COOKER WITH AIR COOLING UNIT AND MULTIPURPOSE COOKING APPARATUS HAVING THE SAME

(75) Inventors: Han Jun Sung, Suwon-si (KR); Yong Hyun Kwon, Suwon-si (KR); Chul Kim, Yongin (KR); Tae Uk Lee, Suwon-si (KR); Sung Ho Lee, Hwasung (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 84 days.

(21) Appl. No.: 10/820,134

(22) Filed: Apr. 8, 2004

(65) Prior Publication Data

US 2005/0066956 A1    Mar. 31, 2005

(30) Foreign Application Priority Data

Sep. 9, 2003    (KR)    ............. 10-2003-0063016

(51) Int. Cl.
*A47J 37/00*    (2006.01)
*A47J 37/07*    (2006.01)
*F24B 1/20*    (2006.01)

(52) U.S. Cl. .............. 126/25 R; 126/9 R; 99/450

(58) Field of Classification Search .............. 126/25 R, 126/39 R, 152 B, 525, 27, 37 R, 214 A, 126/214, 299 R, 41 R
See application file for complete search history.

(56) References Cited

U.S. PATENT DOCUMENTS 3,122,134 A  *  2/1964  Reeves ............... 126/41 R (Continued)

FOREIGN PATENT DOCUMENTS

KR    2000-59792    10/2000

*Primary Examiner*—Cheryl Tyler
*Assistant Examiner*—Michael J. Early
(74) *Attorney, Agent, or Firm*—Staas & Halsey LLP (57) ABSTRACT

A grill cooker that efficiently cools a grilling unit to prevent food from sticking to the grilling unit, and a multipurpose cooking apparatus in which the grill cooker is installed. The grill cooker includes a grilling unit on an upper portion of a cabinet, an air cooling unit on an outside of the cabinet, and a connection member on the upper portion of the cabinet. The grilling unit includes a grilling pipe having an inlet and an outlet. The air cooling unit includes a blowing fan and an air discharging pipe. The connection member has a tapered hole. The inlet of the grilling pipe is connected to an upper portion of the tapered hole, and the air discharging pipe is connected to a lower end of the tapered hole. The grill cooker is removably set in a recess in an upper portion of the multipurpose cooking apparatus.

11 Claims, 7 Drawing Sheets

U.S. PATENT DOCUMENTS

| | | | |
|---|---|---|---|
| 3,930,490 A * | 1/1976 | Lassy et al. | 126/522 |
| 4,026,263 A * | 5/1977 | Boyd | 126/502 |
| 4,062,345 A * | 12/1977 | Whiteley | 126/513 |
| 4,077,388 A * | 3/1978 | Whiteley | 126/522 |
| 4,204,519 A * | 5/1980 | Towery | 126/522 |
| 4,252,106 A * | 2/1981 | Estes | 126/502 |
| 4,258,879 A * | 3/1981 | Nischwitz | 126/502 |
| 4,562,827 A * | 1/1986 | Cerola | 126/299 R |
| 4,648,378 A * | 3/1987 | Nishikawa | 126/21 A |
| 4,665,893 A * | 5/1987 | Miyagawa et al. | 126/299 D |
| 4,813,397 A * | 3/1989 | Yamada | 126/299 R |
| 6,023,051 A * | 2/2000 | Fellows | 219/450.1 |
| 6,405,639 B1 * | 6/2002 | Lee et al. | 99/331 |
| 2002/0148459 A1 * | 10/2002 | McCarty et al. | 126/25 R |
| 2004/0089284 A1 * | 5/2004 | Han et al. | 126/41 R |
| 2004/0149277 A1 * | 8/2004 | Han et al. | 126/25 R |

* cited by examiner

GRILL COOKER WITH AIR COOLING UNIT AND MULTIPURPOSE COOKING APPARATUS HAVING THE SAME

CROSS-REFERENCE TO RELATED APPLICATIONS

This application claims the benefit of Korean Patent Application No. 2003-63016, filed Sep. 9, 2003 in the Korean Intellectual Property Office, the disclosure of which is incorporated herein by reference.

BACKGROUND OF THE INVENTION

1. Field of the Invention

The present invention relates, in general, to a grill cooker and a multipurpose cooking apparatus having the grill cooker and, more particularly, to a grill cooker that allows a grilling unit to be easily and efficiently cooled, thus preventing food from sticking to the grilling unit, and to a multipurpose cooking apparatus having the grill cooker.

2. Description of the Related Art

Generally, meat, such as beef and pork, and processed meat, such as sausages, taste best when cooked by a grilling method in which heat is directly applied to the meat or processed meat placed on a grill. Thus, grilling has been more preferably used, in comparison with other cooking techniques.

A conventional grill cooker to cook food by grilling includes a heating unit and a grilling unit. The heating unit is set in a cabinet of the grill cooker to directly apply heat to the food. The food is placed on the grilling unit to be cooked by the heating unit. Thus, heat generated from the heating unit is transmitted to the food placed on the grilling unit, thus cooking the food.

When a user desires to grill meat, such as beef, pork, and mutton, the meat is cut into small pieces. Next, the meat pieces are seasoned with sauces of several flavors. Thereafter, the seasoned meat pieces are placed on the grilling unit to be grilled. When the seasoned meat pieces are grilled, grease runs from the seasoned meat pieces. The grease is mixed with the sauces, and then is burned by the heat transmitted from the heating unit to the grilling unit, resulting in scorching parts of the meat pieces. Further, the meat pieces may stick to the grilling unit.

The scorched food is unhealthy. When the food sticks to the grilling unit, it is difficult to remove the food from the grilling unit. Thus, the grill unit must be frequently replaced with a new grill unit, thus causing inconvenience to a user. Further, it is very difficult to clean the grilling unit after use.

When the food is scorched, smoke is produced. Thus, an exhaust device, such as an exhaust fan and an exhaust duct, is required to provide a pleasant cooking environment.

The grilling unit may be cooled using water to prevent the food from sticking to the grilling unit. However, several devices, including a circulation pump, a water tank, and a cooling unit to cool the water tank, are required to cool the grilling unit by water cooling. Thus, the grill cooker inevitably has a complicated structure and a large size. Further, after grilling the food, water containing grease and sauces must be replaced with clean water, and several devices to cool the grilling unit must be cleaned, thus causing inconvenience to the user.

Further, it is difficult to install the grill cooker having the complicated structure as described above in a multipurpose cooking apparatus having several cookers.

SUMMARY OF THE INVENTION

Accordingly, it is an aspect of the present invention to provide a grill cooker that allows a grilling unit to be easily and efficiently cooled, thus preventing food from sticking to the grilling unit.

It is another aspect of the present invention to provide a multipurpose cooking apparatus in which the grill cooker is installed.

Additional aspects and/or advantages of the invention will be set forth in part in the description which follows and, in part, will be obvious from the description, or may be learned by practice of the invention.

To achieve the above and/or other aspects of the present invention, there is provided a grill cooker, including a heating unit generating heat to grill food, a grilling unit which is provided above the heating unit, with the food placed on the grilling unit, and an air cooling unit which is connected to the grilling unit to cool the grilling unit using air.

The grilling unit may include a grilling pipe, and the air cooling unit may include a blowing fan to forcibly blow air into the grilling pipe to cool the grilling unit.

The grilling pipe may have an inlet at one end and an outlet at another end thereof. The air cooling unit may further include an air discharging pipe to connect the blowing fan to the inlet of the grilling pipe. Air enters the grilling pipe by the blowing fan blowing air into the air discharging pipe and is discharged to an area outside of the grilling pipe through the outlet of the grilling pipe to maintain a temperature of the grilling pipe below a predetermined temperature.

The grill cooker further comprises a cabinet that is open at a top thereof to form an opening, and wherein the cabinet contains the heating unit, the grilling unit may be seated on the opening of the cabinet, and the air cooling unit may be provided on an outer surface of the cabinet.

A connection member may be provided on an upper portion of the cabinet to connect the air discharging pipe to the inlet of the grilling pipe.

The connection member may include a tapered hole that is tapered in a direction from a top to a bottom of the connection member. The inlet of the grilling pipe is connected to an upper portion of the tapered hole, and the air discharging pipe is connected to a lower portion of the tapered hole to allow the grilling pipe to be removably connected to the air discharging pipe using the connection member.

The grilling unit may further include a frame that is provided on an upper portion of the grilling pipe along an edge of the grilling pipe.

The inlet of the grilling pipe may be downward bent to be inserted into the tapered hole. The outlet of the grilling pipe may be placed at a predetermined position of the frame to allow the frame to be cooled by the air discharged through the outlet of the grilling pipe.

The grilling pipe may include a plurality of grilling pipes, the connection member may comprise a plurality of connection members, and the air discharging pipe may comprise a plurality of air discharging pipes. The plurality of connection members connect the plurality of air discharging pipes to inlets of the plurality of grilling pipes, respectively.

An grease collecting unit may be provided in the cabinet under the grilling unit, to collect grease and sauces dripping from the food that is placed on the grilling unit during grilling of the food.

The heating unit may include a plurality of heating units that are respectively arranged on opposite side surfaces of the cabinet, and the grease collecting unit may include a plurality of heat reflecting plates that face the heating units, respectively to allow heat generated from the heating units to be reflected on the grilling unit.

To achieve the above and/or other aspects of the present invention, there is provided a multipurpose cooking apparatus, including a housing having at least one recess on an upper portion of the housing, and a grill cooker removably seated in the at least one recess. The grill cooker includes a heating unit generating heat to grill food, a grilling unit provided above the heating unit, with the food placed on the grilling unit, and an air cooling unit connected to the grilling unit to cool the grilling unit using air.

The grilling unit may include at least one grilling pipe having an inlet and an outlet. The air cooling unit may include a blowing fan to blow air, and an air discharging pipe to connect the blowing fan to the inlet of the grilling pipe. Air enters the grilling pipe by both the blowing fan and the air discharging pipe, and then is discharged to an outside of the grilling pipe through the outlet of the grilling pipe.

The grill cooker further comprises a cabinet that is open at a top thereof to form an opening, and wherein the cabinet contains the heating unit, the grilling unit may be seated on the opening of the cabinet, and the air cooling unit may be exteriorly provided on a lower portion of the cabinet.

A connection member may be provided on an upper portion of the cabinet to connect the air discharging pipe to the inlet of the grilling pipe. The connection member may have a tapered hole that is tapered in a direction from a top to a bottom of the connection member. The inlet of the grilling pipe is connected to an upper portion of the tapered hole, and the air discharging pipe is connected to a lower portion of the tapered hole to allow the grilling pipe to be removably connected to the air discharging pipe using the connection member.

Further, a depression may be provided on a lower surface of the recess to receive the air cooling unit of the grill cooker. An air hole may be formed on a surface of the depression to draw air into the air cooling unit to allow the grilling unit to be cooled by the air when the grill cooker is set in the recess, the air cooling unit being received in the depression.

BRIEF DESCRIPTION OF THE DRAWINGS

These and/or other aspects and advantages of the invention will become apparent and more readily appreciated from the following description of the preferred embodiments, taken in conjunction with the accompanying drawings of which.

DETAILED DESCRIPTION OF THE PREFERRED EMBODIMENTS

Reference will now be made in detail to the embodiments of the present invention, examples of which are illustrated in the accompanying drawings, wherein like reference numerals refer to like elements throughout. The embodiments are described below to explain the present invention by referring to the figures.

Figure 1:
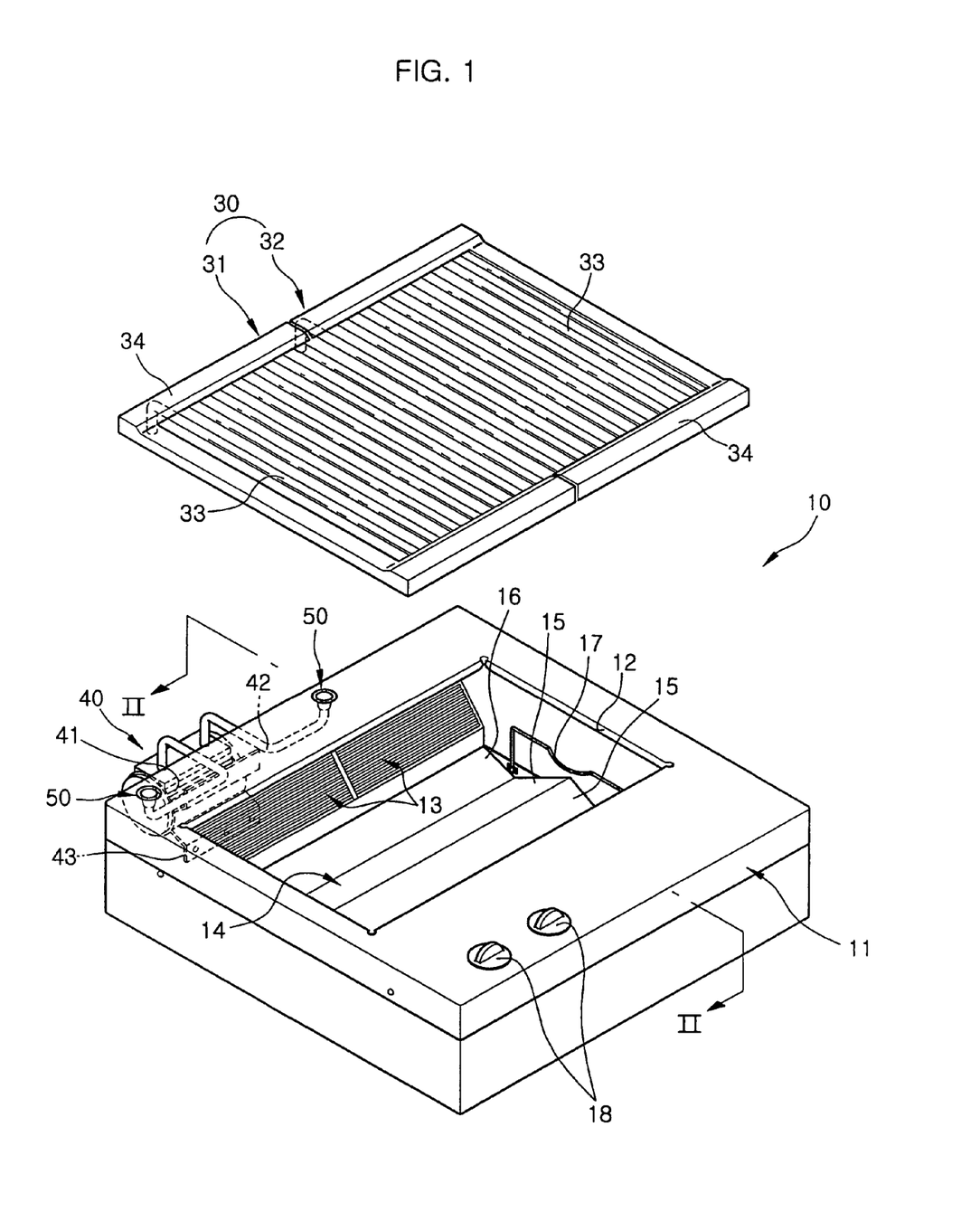
FIG. 1 is a perspective view showing a grill cooker, according to a first embodiment of the present invention.
Figure 2:
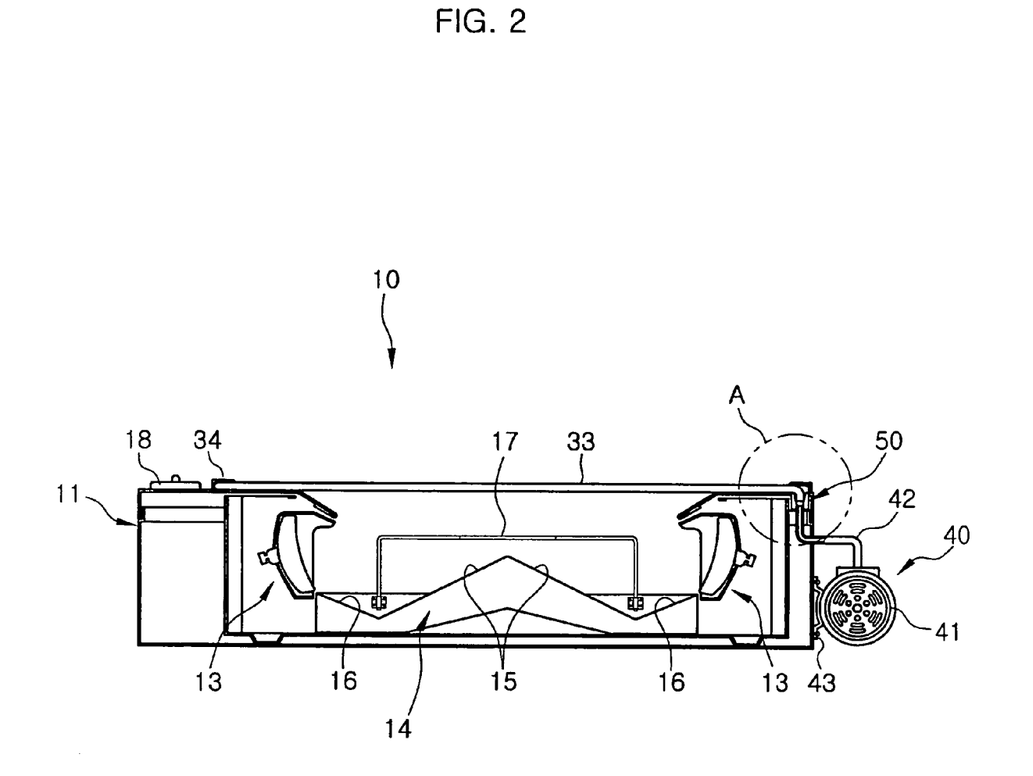
FIG. 2 is a sectional view taken along a line II-II of FIG. 1.

FIG. 1 is a perspective view showing a grill cooker 10, according to a first embodiment of the present invention. FIG. 2 is a sectional view taken along a line II-II of FIG. 1. As shown in FIGS. 1 and 2, the grill cooker 10 according to the first embodiment of the present invention includes a box-shaped cabinet 11, which has an opening 12 at a top thereof. A plurality of heating units 13 are mounted to opposite internal side surfaces of the cabinet 11, and generate heat to cook food. A grilling unit 30 is placed on the opening 12 of the cabinet 11, on which the food to be grilled is placed. A grease collecting unit 14 is set in the cabinet 11 under the grilling unit 30 to collect grease that drips from the food. The grease collecting unit 14 collects grease dripping from the food, and reflects heat from the heating units 13 to the food.

The grease collecting unit 14 has a W-shaped cross-section, and includes heat-reflecting plates 15 and 16, which face the heating units 13. Thus, during grilling of the food, grease and sauces dripping from the food are collected in valleys that are defined along junctions between the heat reflecting plates 15 and 16. Two handles 17 provided on front and rear ends of the grease collecting unit 14 are movable in a vertical direction. Thus, after using the grill cooker 10, a user removes the grease collecting unit 14 from the cabinet 11 using the handles 17 to clean the grease collecting unit 14.

A pair of power switches 18 are provided on an upper surface of the cabinet 11 to regulate heating temperatures of the front and rear heating units 13, respectively. By using the pair of power switches 18, a user can control a size of an effective heating area of the grilling unit 30, which is divided into two sections and seated on the opening 12 of the cabinet 11.

Each of the heating units 13 includes an electric heater that is made of a ceramic material in which a heating wire is embedded. Thus, when electricity is supplied to the heating wire, heat is generated, and, simultaneously, infrared rays are radiated from the ceramic material to grill the food, thus making the food taste better. However, the heating units 13 may have a different construction. For example, the heating units 13 may include a gas heater or a charcoal heater.

When the food is placed on the grilling unit 30 and electricity is supplied to the heating units 13, heat generated from the heating units 13 is transmitted directly to the grilling unit 30, or reflected by the heat reflecting plates 15 and 16 of the grease collecting unit 14 to be transmitted to the grilling unit 30, thus grilling the food placed on the grilling unit 30. Grease and sauces dripping from the food are collected in the grease collecting unit 14.

If the grilling unit 30 overheats, the food would scorch while sticking to the grilling unit 30. Further, the grease and sauces dripping from the food would burn and stick to the grilling unit 30. Thus, the food would taste bad. Further, it would be very difficult to clean the grilling unit 30 after grilling the food.

To solve the above-mentioned problems, the grill cooker 10 according to the first embodiment of the present invention cools the grilling unit 30 using air, thus preventing the food from being scorched and sticking to the grilling unit 30.

An air cooling unit 40 is mounted to an outer surface of the cabinet 11 to circulate air in the grilling unit 30, thus cooling the grilling unit 30. Two connection members 50 are provided on the upper surface of the cabinet 11 to removably and easily connect the grilling unit 30 to the air cooling unit 40.

The air cooling unit 40 includes a blowing fan 41 and two air discharging pipes 42. The blowing fan 41 forcibly circulates air in the grilling unit 30. The air discharging pipes 42 feed air circulated by the blowing fan 41 through the connection members 50 to the grilling unit 30. The air cooling unit 40 is mounted to the cabinet 11 via a bracket 43 that is mounted to a surface of the cabinet 11.

The grilling unit 30 is divided into a first grilling part 31 and a second grilling part 32, which have similar structures. The first grilling part 31 is provided on a front section of the opening 12, while the second grilling part 32 is provided on a rear section of the opening 12. The first grilling part 31 and the second grilling part 32, respectively, include a grilling pipe 33 and a frame 34. The grilling pipe 33 has a zigzag shape. The frame 34 is provided on an upper portion of the grilling pipes 33 along an outer edge of the grilling pipes 33.

The grilling pipes 33 of the first grilling part 31 and the second grilling part 32 are respectively connected to the air discharging pipes 42 of the air cooling unit 40 by the connection members 50. Thus, air fed from the air cooling unit 40 is circulated in each of the grilling pipes 33 to cool the first grilling part 31 and the second grilling part 32, respectively. The structure connecting the air cooling unit 40 to the grilling unit 30 will be described with reference to FIGS. 3 and 4.

Figure 3:
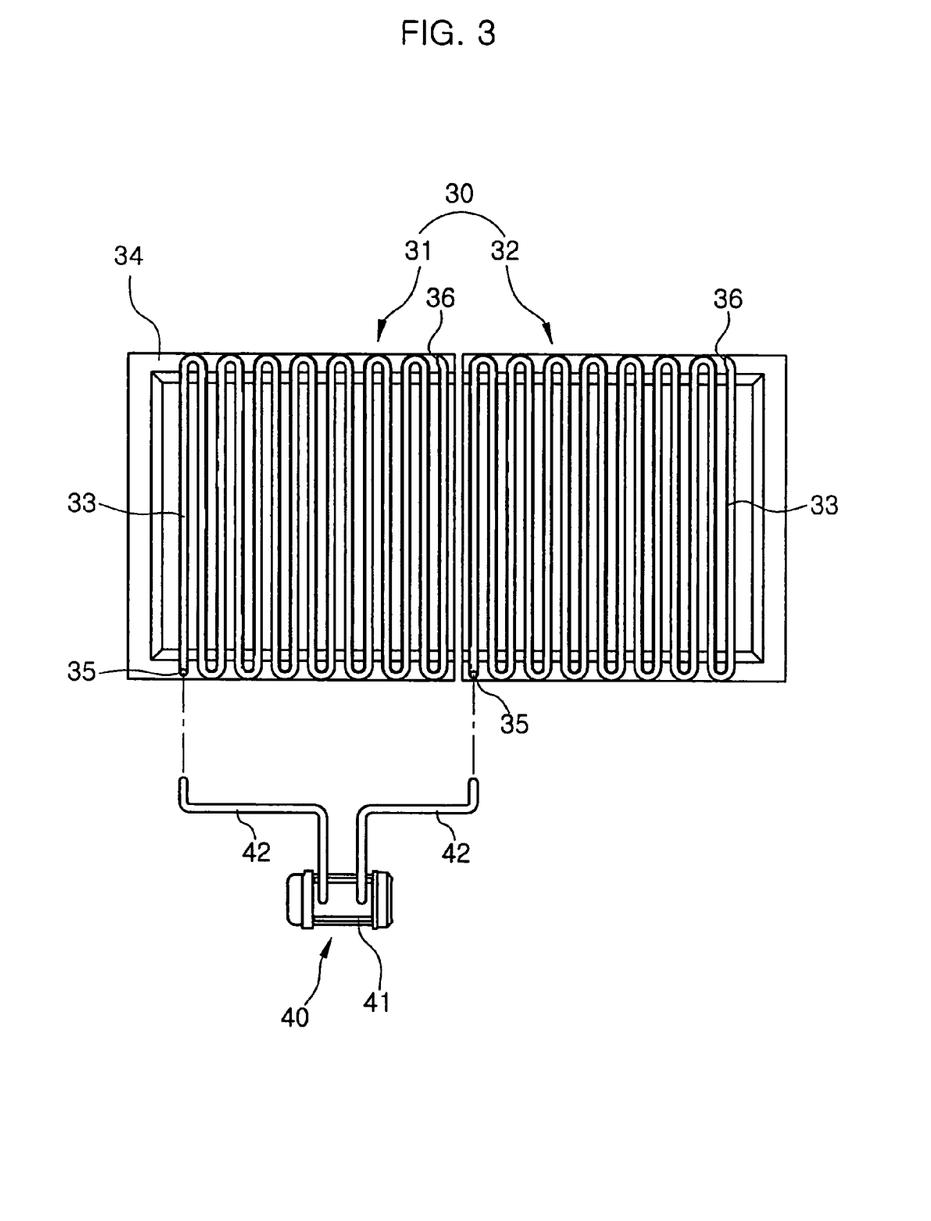
FIG. 3 is a bottom view of a grilling unit cooled by an air cooling unit in the grill cooker of FIG. 1.
Figure 4:
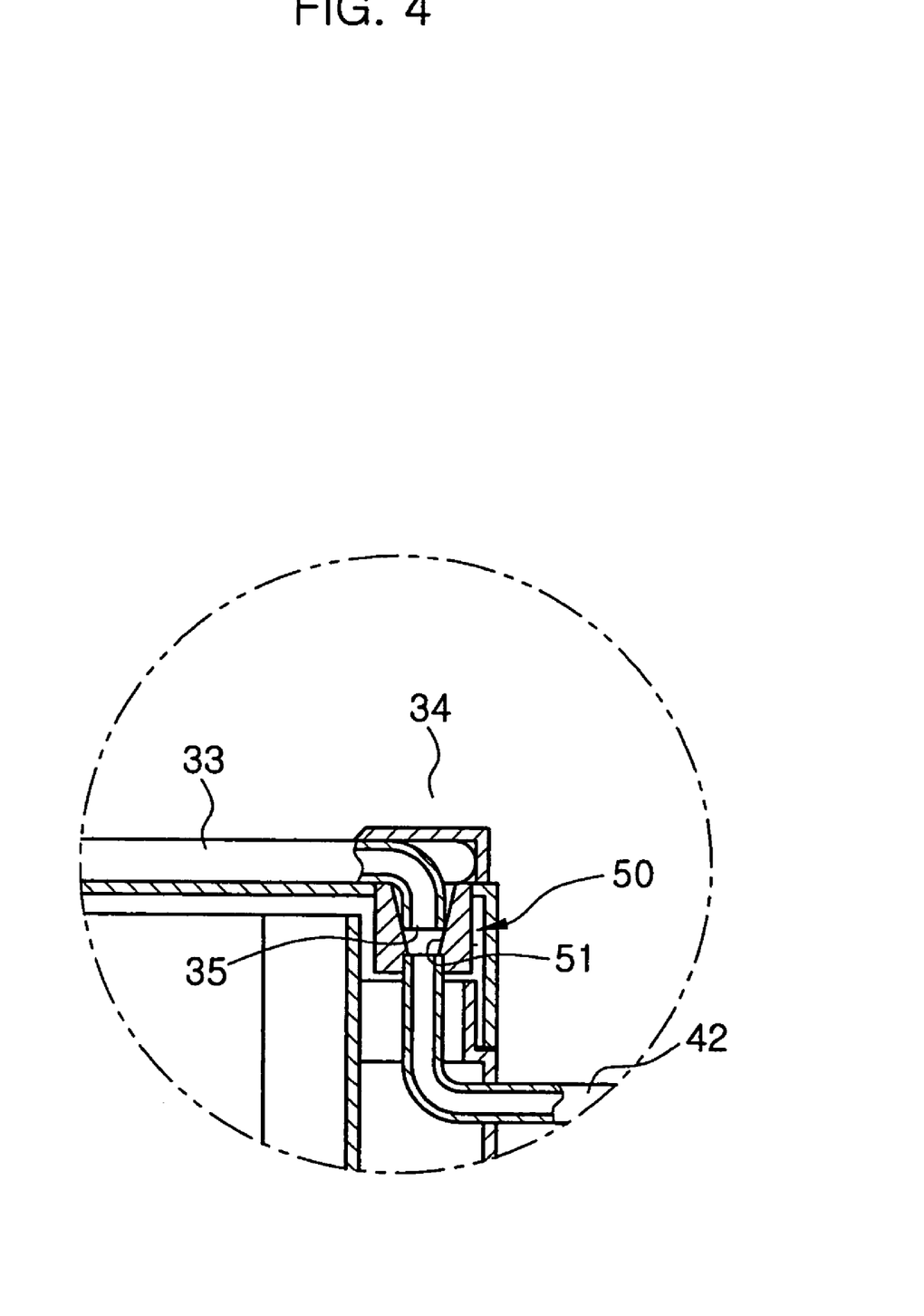
FIG. 4 is an enlarged view of a section A shown in FIG. 2, showing a connection member that connects the grilling unit of FIG. 3 to the air cooling unit.

FIG. 3 is a bottom view of the grilling unit 30 cooled by the air cooling unit 40. FIG. 4 is an enlarged view of a section A shown in FIG. 2, showing the connection member 50, which connects the grilling unit 30 to the air cooling unit 40.

As shown in FIG. 3, each grilling pipe 33 of the first grilling part 31 and the second grilling part 32 is a single pipe which is arranged in a zigzag shape. Each grilling pipe 33 has an inlet 35 at one end and an outlet 36 at the other end thereof. Air is drawn into the pipe through the inlet 35, and is discharged outside the pipe through the outlet 36. The frames 34 are respectively mounted at an upper portion of each of the first grilling part 31 and the second grilling part 32 using any of a variety of mounting techniques, including welding. Each frame 34 of the first grilling part 31 and the second grilling part 32 has a U-shaped structure that extends along the edge of each of the first and second grilling parts 31 and 32, except along positions where the first and second grilling parts 31 and 32 contact each other when the first and second grilling parts 31 and 32 are seated on the opening 12 of the cabinet 11. Thus, when the first and second grilling parts 31 and 32 are seated side by side on the opening 12 of the cabinet 11, the frames 34 form a single edge of the grilling unit 30.

The inlets 35 of the grilling pipes 33 are bent downward to be removably inserted into the connection members 50, which are provided on the upper surface of the cabinet 11. The outlets 36 of the grilling pipes 33 are respectively placed at predetermined positions on the frames 34, thus allowing the frames 34 to be cooled by the air discharged through the outlets 36 of the grilling pipes 33.

As shown in FIG. 4, each of the connection members 50 is provided on the upper portion of the cabinet 11, and has a tapered hole 51 that is tapered in a direction from a top to a bottom of the connection member 50. The connection members 50 are made of a material having a high heat-resistance to be unaffected by heat that is generated by the heating units 13.

A diameter of an upper end of the tapered hole 51 is greater than an outer diameter of each of the grilling pipes 33, while a diameter of a lower end of the tapered hole 51 is less than the outer diameter of each of the grilling pipes 33. Further, the diameter of the lower end of the tapered hole 51 is approximately equal to an outer diameter of each of the air discharging pipes 42 of the air cooling unit 40.

Thus, an outlet of each of the air discharging pipes 42 of the air cooling unit 40 fits into the lower end of the tapered hole 51 using a press-fitting technique, or a welding technique. The air discharging pipes 42 are made of a flexible material. When the outlet of each of the air discharging pipes 42 is removably fitted into the lower end of the tapered hole 51, the air discharging pipes 42 respectively communicate with each of the connection members 50.

When the inlet 35 of each of the grilling pipes 33, which is bent downward, is placed in each of the tapered holes 51, the inlet 35 is removably inserted into each of the tapered holes 51, and is maintained in close contact with an inner surface of each of the tapered holes 51 by gravity.

Thus, when the grilling unit 30 having the first and second grilling parts 31 and 32 is seated on the opening 12 of the cabinet 11 after the inlets 35 of the grilling pipes 33 are respectively aligned with the corresponding tapered holes 51, the grilling pipes 33 respectively communicate with each of the air discharging pipes 42 of the air cooling unit 40 via the connection members 50.

After the food is placed on the grilling unit 30, the heating units 13 and the blowing fan 41 of the air cooling unit 40 operate to circulate air in each of the grilling pipes 33. Thus, the grilling pipes 33 are not heated above a predetermined temperature while the food is grilled.

Figure 5:
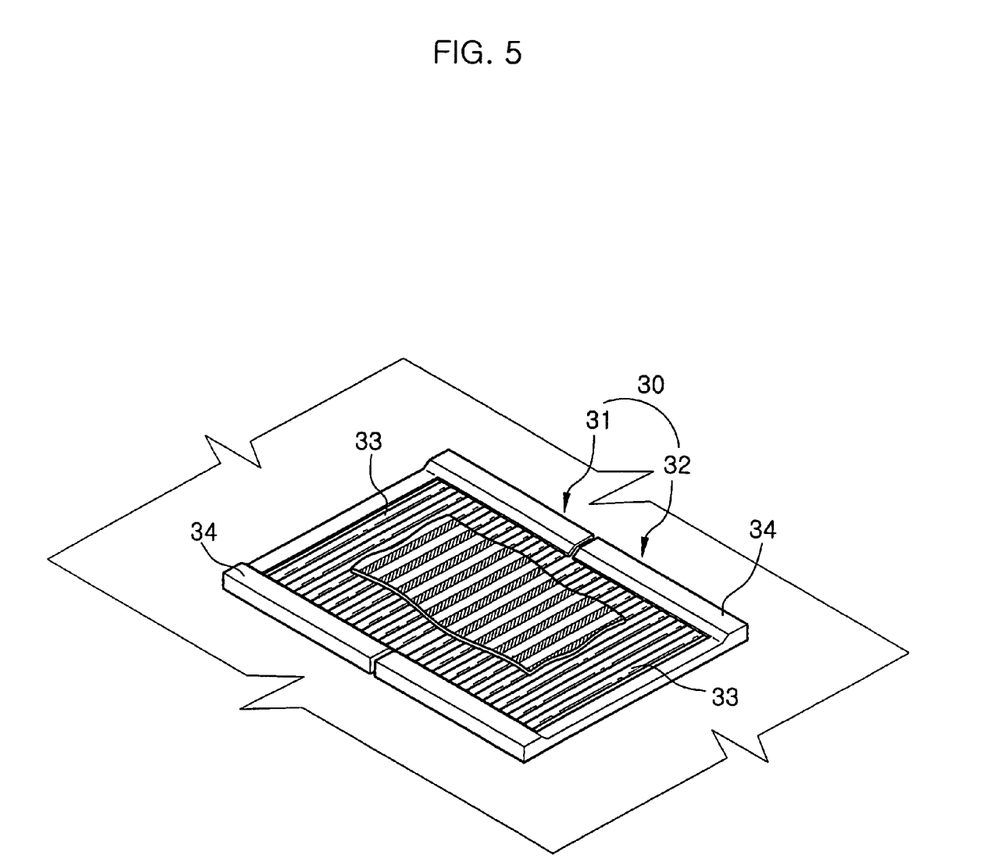
FIG. 5 is a perspective view of the grilling unit in the grill cooker of FIG. 1, showing a grill mark formed on food placed on the grilling unit.

Because the grilling pipes 33 are not excessively heated, the part of the food that is in contact with the grilling pipes 33 does not burn. Thus, the food does not stick to the grilling pipes 33. A grill mark is formed on the part of the food that is in contact with the grilling pipes 33 due to heat generated from the heating units 13, as shown in FIG. 5.

The grilling pipes 33 removably connected to the corresponding connection members 50 are cooled by the air cooling unit 40, thus allowing the food to be easily removed from the grilling pipes 33. Further, residues do not stick to the grilling pipes 33, allowing easy cleaning of the grilling unit 30 after using the grill cooker 10.

A grill cooker 10*a* according to a second embodiment of the present invention, and a multipurpose cooking apparatus 70 having the grill cooker 10*a* will be described with reference to FIGS. 6 and 7.

Figure 6:
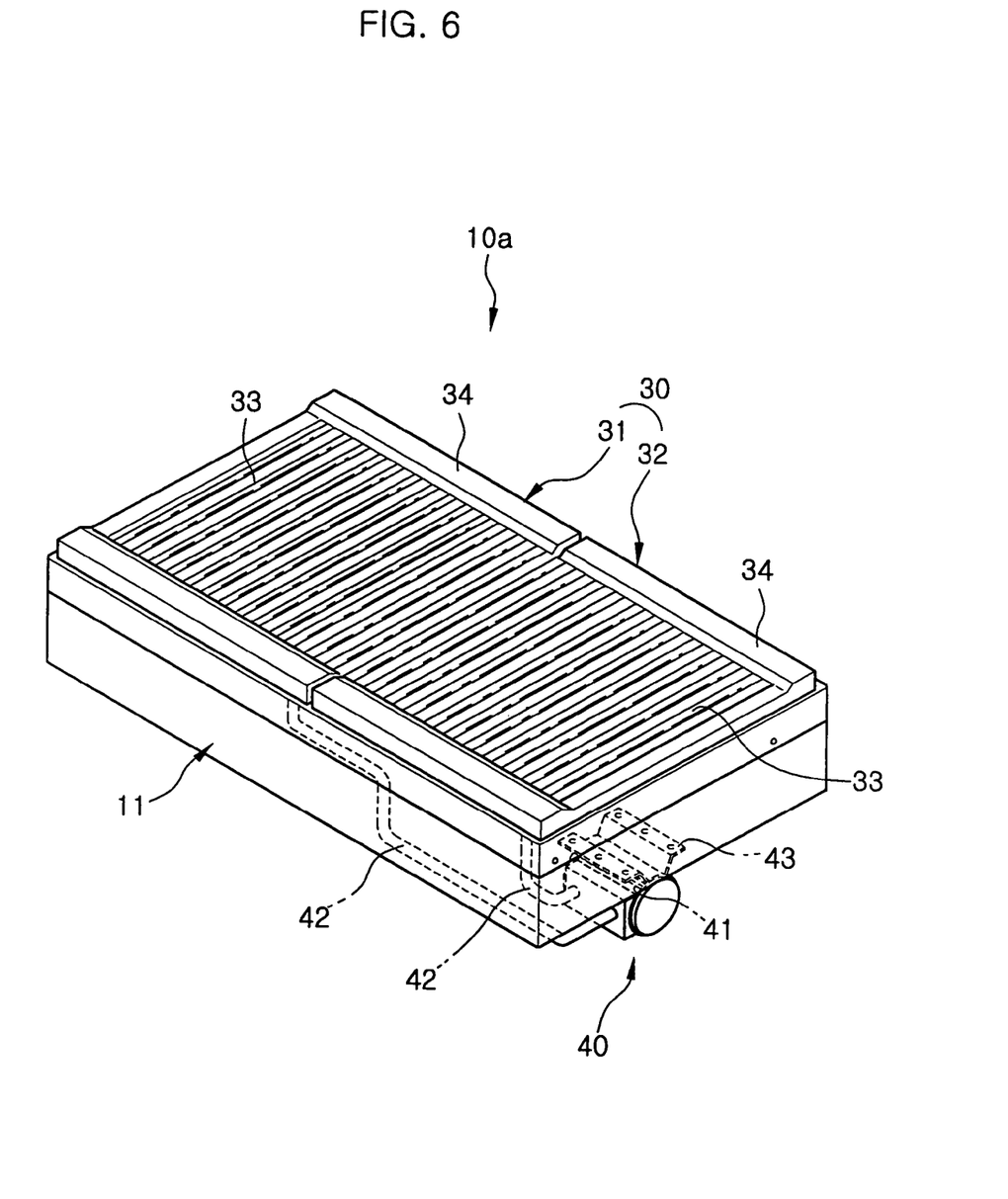
FIG. 6 is a perspective view of a grill cooker, according to a second embodiment of the present invention.

FIG. 6 is a perspective view of the grill cooker 10*a*, according to the second embodiment of the present invention. FIG. 7 is a perspective view of the multipurpose cooking apparatus 70 in which the grill cooker 10a of FIG. 6 is installed.

Figure 7:
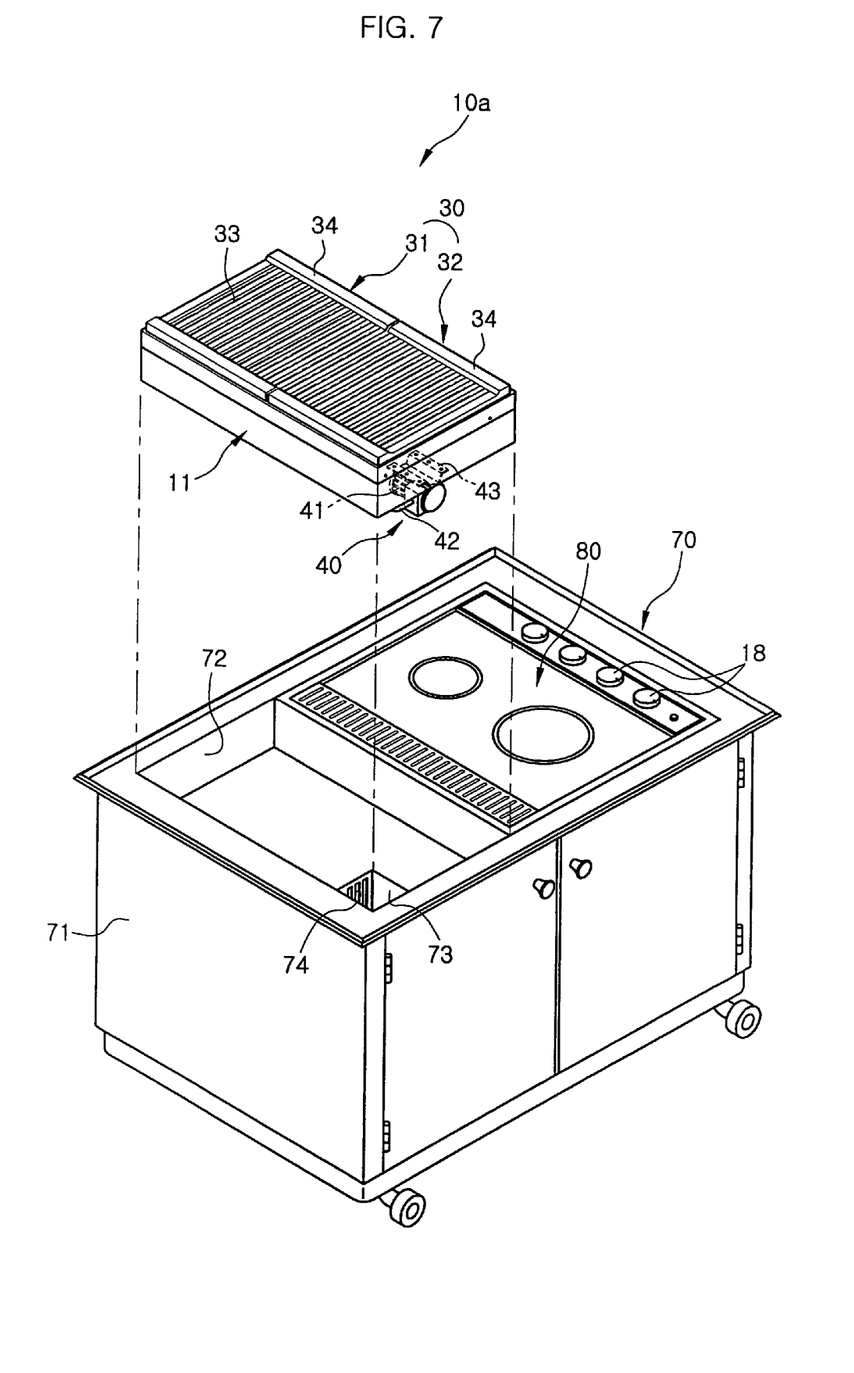
FIG. 7 is a perspective view of a multipurpose cooking apparatus including the grill cooker of FIG. 6.

As shown in FIGS. 6 and 7, in the grill cooker 10a according to the second embodiment of the present invention, an air cooling unit 40, which is connected to connection members 50 of first and second grilling parts 31 and 32, is exteriorly provided on a lower surface of a cabinet 11 and projects downward from the lower surface of the cabinet 11. Therefore, the grill cooker 10a of the second embodiment of the present invention, as well as other kinds of cookers (e.g., cooker 80 as shown in FIG. 7) used in the multipurpose cooking apparatus 70 of FIG. 7, differ from the grill cooker 10 of the first embodiment of the present invention. Power switches 18 are provided on an upper surface of the multipurpose cooking apparatus 70. The general shape of the grill cooker 10a according to the second embodiment remains the same as the grill cooker 10 of the first embodiment, except for positions of the air cooling unit 40 and the power switches 18. Therefore, elements of the grill cooker 10a similar to those of the grill cooker 10 will not be described below in detail.

The multipurpose cooking apparatus 70 includes a housing 71, which defines an external appearance of the multipurpose cooking apparatus 70. A recess 72 is provided on an upper portion of the housing 71 to allow the grill cooker 10a to be removably installed in the multipurpose cooking apparatus 70. The recess 72 has a size corresponding to the grill cooker 10a, and a predetermined depth. A plurality of recesses may be provided on the upper portion of the housing 71 to receive different kinds of cookers, as well as the grill cooker 10a.

A depression 73 is provided on a lower surface of the recess 72 to receive the air cooling unit 40 of the grill cooker 10a. An air hole 74 is formed on a surface of the depression 73 to draw air into the air cooling unit 40. Thus, when the grill cooker 10a is set in the recess 72, which is provided on the upper portion of the housing 71, the air cooling unit 40 is received in the depression 73, and the air is drawn into the air cooling unit 40 through the air hole 74, thus allowing the grilling unit 30 to be cooled by the air.

After the food is grilled using the grill cooker 10a, a user removes the grilling unit 30 from the cabinet 11, and then grasps inner side ends of the cabinet 11 of the grill cooker 10a to raise up the cabinet 11. Thus, the cabinet 11 is easily removed from the multipurpose cooking apparatus 70, making it easier to clean the grill cooker 10a.

As is apparent from the above description, the present invention provides a grill cooker, which easily and efficiently cools a grilling unit using an air cooling unit and a connection member having a simple construction, thus allowing food to be easily removed from the grilling unit. Further, because the food does not stick to the grilling unit, the food tastes better, and is healthier. Furthermore, it is easy to clean the grilling unit.

In the grill cooker according to the present invention, the air cooling unit having a simple construction is exteriorly mounted to a lower portion of a cabinet of the grill cooker, thus allowing the grill cooker to be easily installed in a multipurpose cooking apparatus with other kinds of cookers.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A grill cooker, comprising:
   a heating unit generating heat to grill food;
   a grilling unit provided above the heating unit, with the food placed on the grilling unit, the grilling unit comprising a grilling pipe above the heating unit;
   an air cooling unit connected to the grilling unit to cool the grilling unit using air, wherein the air cooling unit comprises:
   a blowing fan to blow air into the grilling pipe to cool the grilling unit, the grilling pipe has an inlet at one end and an outlet at another end thereof, and
   an air discharging pipe to connect the blowing fan to the inlet of the grilling pipe, the air entering the grilling pipe by the blowing fan blowing air into the air discharging pipe and being discharged to an area outside of the grilling pipe through the outlet of the grilling pipe to maintain a temperature of the grilling pipe below a predetermined temperature;
   a cabinet that is open at a top thereof to form an opening, wherein the cabinet includes the heating unit, the grilling unit is seated on the opening of the cabinet, and the air cooling unit is provided on an outer surface of the cabinet; and
   a connection member provided on an upper portion of the cabinet to connect the air discharging pipe to the inlet of the grilling pipe,
   wherein the connection member comprises a tapered hole that is tapered in a direction from a top to a bottom of the connection member, the inlet of the grilling pipe being connected to an upper portion of the tapered hole, and the air discharging pipe being connected to a lower portion of the tapered hole to allow the grilling pipe to be removably connected to the air discharging pipe using the connection member.

2. The grill cooker according to claim 1, wherein the grilling unit further comprises a frame that is provided on an upper portion of the grilling pipe along an edge of the grilling pipe.

3. The grill cooker according to claim 2, wherein
   the inlet of the grilling pipe is downward bent to be inserted into the tapered hole, and
   the outlet of the grilling pipe is placed at a predetermined position of the frame to allow the frame to be cooled by the air discharged through the outlet of the grilling pipe.

4. The grill cooker according to claim 1, wherein the grilling pipe comprises a plurality of grilling pipes, the connection member comprises a plurality of connection members, and the air discharging pipe comprises a plurality of air discharging pipes, the plurality of connection members connecting the plurality of air discharging pipes to inlets of the plurality of grilling pipes, respectively.

5. The grill cooker according to claim 1, further comprising an grease collecting unit, provided in the cabinet under the grilling unit, to collect grease and sauces dripping from the food that is placed on the grilling unit during grilling of the food.

6. The grill cooker according to claim 5, wherein
the heating unit comprises a plurality of heating units that are respectively arranged on opposite side surfaces of the cabinet, and
the grease collecting unit comprises a plurality of heat reflecting plates that face the heating units, respectively, to allow heat generated from the heating units to be reflected on the grilling unit.

7. The grill cooker according to claim 1, wherein the upper portion of the tapered hole has a diameter greater than an outer diameter of the grilling pipe, the lower portion of the tapered hole has a diameter less than the outer diameter of the grilling pipe, and the diameter of the lower portion of the tapered hole is approximately equal to an outer diameter of the air discharging pipe.

8. The grill cooker according to claim 1, wherein the air goes through the grilling pipe having the food thereon.

9. A multipurpose cooking apparatus, comprising:
a housing having at least one recess on an upper portion of the housing;
a grill cooker removably seated in the at least one recess, the grill cooker comprising:
a heating unit generating heat to grill food,
a grilling unit provided above the heating unit, with the food placed on the grilling unit, the grilling unit comprising at least one grilling pipe above the heating unit and comprising an inlet and an outlet, and
an air cooling unit connected to the grilling unit to cool the grilling unit using air, wherein the air cooling unit comprises:
a blowing fan to blow air, and
an air discharging pipe to connect the blowing fan to the inlet of the grilling pipe, with air entering the grilling pipe by both the blowing fan and the air discharging pipe, and then being discharged to an outside of the grilling pipe through the outlet of the grilling pipe;
a cabinet that is open at a top thereof to form an opening, wherein the cabinet contains the heating unit, the grilling unit is seated on the opening of the cabinet, and the air cooling unit is exteriorly provided on a lower portion of the cabinet; and
a connection member provided on an upper portion of the cabinet to connect the air discharging pipe to the inlet of the grilling pipe, the connection member having a tapered hole that is tapered in a direction from a top to a bottom of the connection member, with the inlet of the grilling pipe being connected to an upper portion of the tapered hole, and the air discharging pipe being connected to a lower portion of the tapered hole to allow the grilling pipe to be removably connected to the air discharging pipe using the connection member.

10. The multipurpose cooking apparatus according to claim 9, further comprising a depression on a lower surface of the recess to receive the air cooling unit of the grill cooker, with an air hole on a surface of the depression to draw air into the air cooling unit to allow the grilling unit to be cooled by the air when the grill cooker is set in the recess, the air cooling unit being received in the depression.

11. The multipurpose cooking apparatus according to claim 10, wherein the air cooling unit extends downward from the lower portion of the cabinet and is received by the depression.

\* \* \* \* \*